United States Patent
Kritt et al.

(10) Patent No.: US 10,872,111 B2
(45) Date of Patent: Dec. 22, 2020

(54) USER GENERATED DATA BASED MAP SEARCH

(71) Applicant: LENOVO Enterprise Solutions (Singapore) PTE. LTD., New Tech Park (SG)

(72) Inventors: Barry Alan Kritt, Research Triangle Park, NC (US); Sarbajit Kumar Rakshit, Kolkata (IN)

(73) Assignee: LENOVO Enterprise Solutions (Singapore) PTE. LTD, Singapore (SG)

( * ) Notice: Subject to any disclaimer, the term of this patent is extended or adjusted under 35 U.S.C. 154(b) by 1062 days.

(21) Appl. No.: 14/597,185

(22) Filed: Jan. 14, 2015

(65) Prior Publication Data

US 2016/0203143 A1 Jul. 14, 2016

(51) Int. Cl.
 *G06F 16/40* (2019.01)
 *G06F 16/44* (2019.01)
 *G06F 16/338* (2019.01)

(52) U.S. Cl.
 CPC .......... *G06F 16/444* (2019.01); *G06F 16/338* (2019.01)

(58) Field of Classification Search
 CPC ..................................... G06Q 50/01
 See application file for complete search history.

(56) References Cited

U.S. PATENT DOCUMENTS

| 8,467,955 B2* | 6/2013 | Jiang .................. G01C 21/20 340/988 |
| 8,504,512 B2 | 8/2013 | Herzog et al. |
| 8,604,977 B2 | 12/2013 | Wilfert et al. |
| 2009/0233629 A1* | 9/2009 | Jayanthi ............. H04L 12/5865 455/457 |
| 2010/0118025 A1* | 5/2010 | Smith .................... G06Q 30/02 345/418 |

(Continued)

FOREIGN PATENT DOCUMENTS

WO   2012159093 A2   11/2012

OTHER PUBLICATIONS

Ali Shokoufandeh, et al. "View-based Object Recognition Using Saliency Maps", Image and Vision Computing 17, (May 5, 1998), pp. 445-460.

*Primary Examiner* — Mohammad S Rostami
(74) *Attorney, Agent, or Firm* — Kunzler Bean & Adamson; Bruce R. Needham

(57) ABSTRACT

An apparatus for presenting search results includes a content module that gathers user-generated content from a plurality of users of a social networking service, the user-generated content relating to one or more of an event and an activity, a cluster module that identifies a cluster of related user-generated content from the location information of the gathered user-generated content, the cluster comprising a plurality of items of user-generated content relating to one or more of a common event and an activity that have a geographically similar location, an area module that determines an area containing the cluster of related user-generated content, a search module that receives a search query, the search query related to one or more of the common event and activity of the cluster, and a map display module that presents, on an electronic map, a boundary for the determined area.

20 Claims, 7 Drawing Sheets

(56) References Cited

U.S. PATENT DOCUMENTS

| | | | |
|---|---|---|---|
| 2011/0184768 A1* | 7/2011 | Norton | G06Q 10/02 705/5 |
| 2011/0302153 A1* | 12/2011 | Meretakis | G06F 17/30864 707/722 |
| 2012/0066212 A1* | 3/2012 | Jennings | G06F 17/30144 707/723 |
| 2012/0092161 A1* | 4/2012 | West | G08B 25/005 340/540 |
| 2012/0136565 A1 | 5/2012 | Kennedy et al. | |
| 2012/0136689 A1* | 5/2012 | Ickman | G06Q 10/1095 705/7.19 |
| 2013/0040654 A1* | 2/2013 | Parish | H04L 63/0807 455/456.1 |
| 2013/0073400 A1* | 3/2013 | Heath | G06Q 30/02 705/14.73 |
| 2013/0159106 A1* | 6/2013 | Gross | G06F 17/30867 705/14.54 |
| 2013/0232435 A1* | 9/2013 | Knapp | G06F 3/0484 715/771 |
| 2013/0265312 A1* | 10/2013 | Dunko | G06Q 10/00 345/440 |
| 2013/0325394 A1* | 12/2013 | Yuen | A61B 5/0002 702/150 |
| 2014/0095509 A1* | 4/2014 | Patton | G06F 17/30241 707/740 |
| 2014/0156746 A1* | 6/2014 | Wheatley | H04L 67/22 709/204 |
| 2014/0236946 A1* | 8/2014 | Abhyanker | G06Q 10/087 707/737 |
| 2014/0288680 A1* | 9/2014 | Hoffman | G06K 9/00342 700/91 |
| 2014/0337120 A1* | 11/2014 | Ercanbrack | G06Q 30/0244 705/14.43 |
| 2015/0019642 A1* | 1/2015 | Wang | H04L 67/306 709/204 |
| 2016/0088099 A1* | 3/2016 | Crudele | H04L 51/20 709/204 |

* cited by examiner

USER GENERATED DATA BASED MAP SEARCH

FIELD

The subject matter disclosed herein relates to searching an electronic map and more particularly relates to presenting search results within a map boundary defined using user-generated content.

BACKGROUND

Description of the Related Art

Conventionally, area boundaries for electronic maps are predefined. A user may give as search criteria a location name, and existing systems will display a predefined boundary for the named location. However, map boundaries cannot be predefined for events or activities that lack permanent locations, are transient, or are temporary (e.g., seasonal).

BRIEF SUMMARY

An apparatus for presenting search results within a map boundary defined using user-generated content is disclosed. A method and computer program product also perform the functions of the apparatus. The apparatus includes a content module that gathers user-generated content from a plurality of users of a social networking service. The user-generated content relates to an event and/or an activity. Each item of user-generated content includes time and location information. The apparatus includes a cluster module that identifies a cluster of related user-generated content from the location information of the gathered user-generated content. The cluster includes a plurality of items of user-generated content relating to a common event and/or an activity that have a geographically similar location. The apparatus includes an area module that determines an area containing the cluster of related user-generated content, and a search module that receives a search query. The search query is related to the common event and/or activity of the cluster. The apparatus includes a map display module that, in response to receiving the search query, presents, on an electronic map, a boundary for the determined area.

In certain embodiments, the map display module identifies, based on the search query, the cluster of related user-generated content from a plurality of clusters of user-generated content, and the map display module presents the boundary for the determined area of the identified cluster. The determined area may include the locations related to each item of user-generated content in the cluster. Additionally, the determined area may include a perimeter area in excess of an area that includes the locations related to each item of user-generated content in the cluster.

In some embodiments, the apparatus also includes an object module that identifies one or more objects within each item of user-generated content. The objects relate to the common event, the common activity, and/or the location of the user-generated content. The object module may perform a contextual analysis on the user-generated content to identify the one or more objects.

Additionally, the apparatus may include a prediction module that uses the identification of the one or more objects within the user-generated content to identify an event, an activity, attributes of an event, and/or attributes of an activity. The cluster module then uses the event, the activity, attributes of the event, and attributes of the activity of each item of user-generated content to identify the cluster where the common event, the common activity, attributes of the common event and/or attributes of the common activity are searchable by the search module.

In some embodiments, the apparatus also includes a topic module that identifies a topic of each item of user-generated content where the cluster module identifies user-generated content as belonging to the cluster based on the identified topic. In some embodiments, the apparatus also includes a window module that determines if an item of user-generated content is generated within a moving window of time, where the cluster module identifies user-generated content as belonging to the cluster based on whether the user-generated content is within the moving window of time.

In some embodiments, the apparatus also includes a threshold module that compares a generation rate at which the related user-generated content is generated to a generation rate threshold, where the cluster module identifies the cluster based on whether the generation rate exceeds the generation rate threshold. In some embodiments, the apparatus also includes a weighting module that assigns greater weight to newer user-generated content and lesser weight to older user-generated content, where the cluster module identifies the cluster based on the weighted user-generated content.

In some embodiments, the apparatus also includes a frequency module that identifies a relative frequency of user-generated content within the area, where the map display module indicates the relative frequency on the electronic map. In some embodiments, the apparatus also includes an age module that identifies an age of user-generated content within the area, where the map display module indicates the age on the electronic map. In some embodiments, the apparatus also includes an adjustment module that dynamically adjust the area and boundary of the cluster based on the times and locations of the user-generated content.

A method for presenting search results may include gathering, by use of a processor, user-generated content from a plurality of users of a social networking service. The user-generated content relates to an event and/or an activity. Each item of user-generated content includes time and location information. The method includes identifying a cluster of related user-generated content from the location information of the gathered user-generated content. The cluster includes a plurality of items of user-generated content relating to a common event and/or an activity that have a geographically similar location. The method includes determining an area containing the cluster of related user-generated content, receiving a search query, where the search query is related to the common event and/or activity of the cluster, and displaying, on an electronic map, a boundary for the determined area in response to receiving the search query.

In some embodiments, the method also includes identifying one or more objects within each item of user-generated content where the objects relate to the common event, the common activity, and/or the location of the user-generated content. In certain embodiments, identifying a cluster of related user-generated content includes determining if an item of user-generated content is generated within a moving window of time and identifying user-generated content as belonging to the cluster based on whether the user-generated content is within the moving window of time.

In some embodiments, the method also includes identifying an age and/or a relative frequency of user-generated content within the area and indicating the age and/or relative frequency on the electronic map. In some embodiments, the method also includes dynamically adjusting the area and boundary of the cluster based on the times and locations of the user-generated content.

The program product for presenting search results may be a computer readable storage medium storing code executable by a processor. The executable code may include code for gathering user-generated content from a plurality of users of a social networking service. The user-generated content relates to an event and/or an activity. Each item of user-generated content includes time and location information. The executable code may include code for identifying a cluster of related user-generated content from the location information of the gathered user-generated content, where the cluster includes a plurality of items of user-generated content relating to a common event and/or an activity that have a geographically similar location, determining an area containing the cluster of related user-generated content, receiving a search query, where the search query is related to the common event and/or activity of the cluster, and presenting, on an electronic map, a boundary for the determined area in response to receiving the search query.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
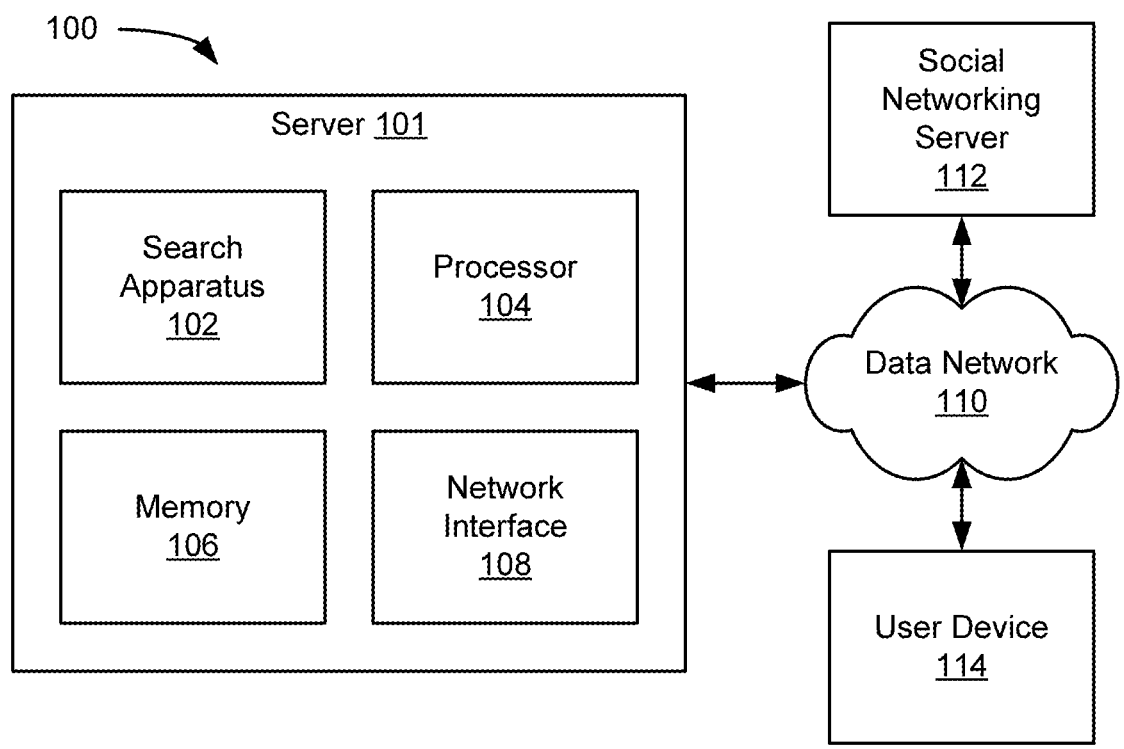
FIG. 1 is a schematic block diagram illustrating one embodiment of a system for presenting search results within a map boundary defined using user-generated content.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products gather user-generated content from a plurality of users of a social networking service, identify a cluster of user-generated content relating to one or more of a common event and an activity that have a geographically similar location, determine an area containing the cluster of related user-generated content, receive a search query relating to one or more of the common event and activity of the cluster, and present, on an electronic map, a boundary for the determined area.

FIG. 1 depicts a system 100 for presenting search results within a map boundary defined using user-generated content, according to embodiments of the disclosure. The system 100 includes a server 101 containing a search apparatus 102, a processor 104, a memory 106, and a network interface 108. The system 100 further includes a data network 110, at least one social networking server 112, and at least one user device 114, where the server 101, the social networking server(s) 112, and/or the user device(s) 114 communicate with one another via the data network 110.

The search apparatus 102, in one embodiment, is configured to gather user-generated content from a plurality of users of a social networking service, identify a cluster of related user-generated content from location information of the gathered user-generated content, determine an area containing the cluster, and to display, on an electronic map, a boundary for the determined area in response to receiving a search query related to an event and/or activity of the cluster. In some embodiments, the search apparatus 102 also identifies one or more objects within each item of user-generated content. The objects typically relate to a common event, a common activity, and/or the location of the user-generated content. In further embodiments, the search apparatus 102 displays locations of the one or more objects on the electronic map, responsive to the search query.

The search apparatus 102 may include computer hardware, computer software, or a combination of both computer hardware and computer software. For example, the search apparatus 102 may include circuitry, or a processor, configured to receive a search query. As another example, the search apparatus 102 may comprise computer program code that allows the processor 104 to identify a cluster of related user-generated content. The search apparatus 102 is discussed in further detail with reference to FIG. 2, below.

The processor 104, in one embodiment, may include any known controller capable of executing computer-readable instructions and/or capable of performing logical operations. For example, the processor 104 may be a microcontroller, a microprocessor, a central processing unit (CPU), a graphics processing unit (GPU), an auxiliary processing unit, a field programmable gate array (FPGA), or similar programmable controller. In some embodiments, the processor 104 executes instructions stored in the memory 106 to perform the methods and routines described herein. The processor 104, in one embodiment, is communicatively coupled to the search apparatus 102, the memory 106, and the network interface 108.

The memory 106, in one embodiment, is a computer readable storage medium. In some embodiments, the memory 106 includes volatile computer storage media. For example, the memory 106 may include a random access memory (RAM), including dynamic RAM (DRAM), synchronous dynamic RAM (SDRAM), and/or static RAM (SRAM). In some embodiments, the memory 106 includes non-volatile computer storage media. For example, the memory 106 may include a hard disk drive, a flash memory, or any other suitable non-volatile computer storage device. In some embodiments, the memory 106 includes both volatile and non-volatile computer storage media.

In some embodiments, the memory 106 stores data relating to automatically adjusting a vehicle light level based on a viewing location of an occupant. For example, the memory 106 may store user-generated content, locations and times associated with user-generated content, one or more algorithms for analyzing user-generated content, clusters of related user-generated content, areas and boundaries of clusters of related user-generated content, objects within the clusters of user-generated content, and the like. In some embodiments, the memory 106 also stores program code and related data, such as an operating system or other controller algorithms operating on the server 101.

The network interface 108, in one embodiment, includes software and/or hardware connecting the server 101 to the data network 110. For example, the network interface 108 may include a physical network adapter and one or more protocol stacks for communicating with nodes of the data network 110 using computer networking protocols. In one embodiment, the network interface 108 may include a wireless networking interface that connects the server 101 to the data network 110 over radio or other wired or wireless communication mediums. In another embodiment, the network interface 108 may include a wired or fiber optic interface for connecting to the data network 110.

The data network 110, in one embodiment, is a telecommunications network configured to allow the server 101, the social networking server 112, and/or the user device 114, as well as other devices, to communicate data with each other. The data network 110 may include wired data links, wireless data links, and/or a combination of wired and wireless data links. Examples of wireless data networks include, but are not limited to, a wireless cellular network, a local wireless network, such as a Wi-Fi network, a Bluetooth® network, a near-field communication (NFC) network, an ad hoc network, and/or the like. The data network 110 may include a wide area network (WAN), a storage area network (SAN), a local area network (LAN), an optical fiber network, the internet, or other digital communication network. In some embodiments, the data network 110 may include two or more networks. The data network 110 may include one or more servers, routers, switches, and/or other networking equipment. The data network 110 may also include computer readable storage media, such as a hard disk drive, an optical drive, non-volatile memory, random access memory (RAM), or the like.

The social networking server 112, in one embodiment, provides a social networking service to a plurality of social network members. In various embodiments, a social networking server 112 may include a mainframe computer, a blade server, a workstation, a desktop computer, or the like. In certain embodiments, the social networking server 112 stores social networking profiles for each member of the social networking service and a plurality of content items generated by the social network members.

In some embodiments, the social networking server 112 may include one or more storage devices that store content generated by users of the social networking service. In further embodiments, the social networking server 112 may store user-generated content on one or more external storage devices accessible through the data network 110. The user-generated content may include, but is not limited to, digital images, digital video, status updates, text messages, posts, chat discussions, comments to user-generated content, and the like.

In one embodiment, the social networking server 112 may allow the social network members to form affiliations (e.g., social networks) within the social networking service. In various embodiments, affiliated members may be described using terms such as "friends," "connections," "followers," or the like. As used herein, a member's "social network" may refer to that member's affiliated members, their affiliated members, and so on, so that a graph of the member's social network forms a net-like structure. The member's affiliations may be stored as a part of the member's social networking profile.

In the depicted embodiment, a single social networking server 112 provides the social networking service. In another embodiment, a plurality of social networking servers 112 may provide the social networking service. In yet another embodiment, the social networking server 112 may provide a plurality of different social networking services. User-generated content for each social networking service may be stored on or accessible by the social networking server 112.

The user device 114, in one embodiment, includes an electronic device capable of sending a search query to the server 101. In some embodiments, the user device 114 includes a cellular phone, a smart phone, a vehicle navigation system, a personal digital assistant, a tablet computer, a laptop computer, a desktop computer, or any suitable consumer computing device. The user device 114 is connected to the server 101 via the data network 110, wherein the server 101 receives the search query via the network interface 108.

The user device 114 may send a search query relating to particular events, activities, or attributes of events or activities within a particular geographical area. In some embodiments, the particular events are temporary events, such as seasonal markets or displays. In some embodiments, the particular activities are transient activities without a set location. Examples of activities include hiking, fishing, hunting, picnicking, rallies, and the like. As an example, a user may search for trinkets sold in a holiday market of a nearby city.

The user device 114 may then receive a search result from the server 101, the search result including an electronic map, and display the electronic map to the user of the user device 114. The displayed electronic map includes a boundary of a cluster of user-generated content relating to the search query (e.g., the particular events, activities, or attributes of events or activities within a particular geographical area). The displayed electronic map may also include locations of one or more objects within the cluster that relate to the search query. For example, the map may display a user-defined boundary of the holiday market of the nearby city as well as locations of several stalls selling the searched for trinkets.

In some embodiments, the user of the user device 114 is a member of the social networking service provided by the social networking server 112 and generates content items which are stored on the social networking server 112 (or on a network storage device associated with the social networking server 112). Accordingly, the user device 114 may upload the user-generated content to the social networking server 112. For example, the user device 114 may include a smartphone that posts user-generated digital photographs to the social networking server 112.

In certain embodiments, the user device 114 connects to the data network 110 via a wireless network connection. The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal®.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT and/or ANT+ connection as defined by Dynastream Innovations Inc.® of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

Figure 2:
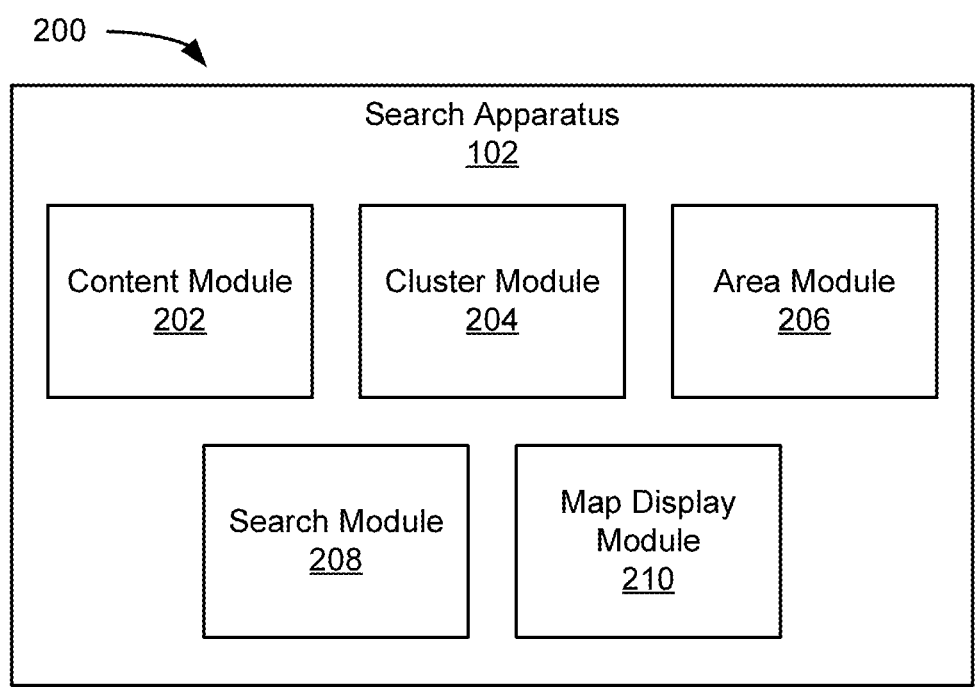
FIG. 2 is a schematic block diagram illustrating one embodiment of an apparatus for presenting search results within a map boundary defined using user-generated content.

FIG. 2 depicts an apparatus 200 for presenting search results within a map boundary defined using user-generated content, according to embodiments of the disclosure. The apparatus 200 includes one embodiment of a search apparatus 102, which may be substantially similar to the search apparatus 102 described above with reference to FIG. 1. In general, as described above, the apparatus 200 gathers user-generated content from a plurality of users of a social networking service, identifies a cluster of user-generated content relating to one or more of a common event and an activity that have a geographically similar location, determines an area containing the cluster of related user-generated content, receives a search query relating to one or more of the common event and activity of the cluster, and presents, on an electronic map, a boundary for the determined area.

The apparatus 200 includes, in one embodiment, a search apparatus 102 that includes a content module 202, a cluster module 204, an area module 206, a search module 208, and a map display module 210. The modules of the search apparatus 102 may be communicatively coupled to one another.

The content module 202, in one embodiment, is configured to gather user-generated content from a plurality of users of a social networking service, for example a social networking service provided by the social networking server 112. The gathered user-generated content may relate to an event and/or to an activity. Additionally, each item of user-generated content may include time and location information, for example as metadata. In certain embodiments, the content module 202 gathers the user-generated content from the social networking server 112 over the data network 110 via the network interface 108.

In some embodiments, the content module 202 includes a web crawler, an automatic indexer, or another program suitable for gathering and compiling user-generated content from a plurality of users of the social networking service. In some embodiments, the social networking server 112 pushes user-generated content to the content module 202, responsive to instructions from the content module 202. In some embodiments, the content module 202 constantly queries the social networking server 112 for newly generated content, wherein the social networking server 112 provides new user-generated content to the content module 202. The content module 202 may use any known data retrieval techniques to gather the user-generated content from the social networking server 112.

In some embodiments, the content module 202 identifies one or more objects within each item of user-generated content, the objects relating to one or more of the common event, the common activity, attributes of the common event and/or activity, and the location of the user-generated content. The identified objects may include stores, shops, stalls, vendors, items for sale, and/or points of interest associated with the event and/or activity. In certain embodiments, the objects are provided to the cluster module 204, wherein the cluster module 204 identifies a cluster of related user-generated content based, in part, on objects within the user-generated content. In further embodiments, the identified objects are searchable by the search module 208 and may be included with search results relating to the event and/or activity.

In some embodiments, the content module 202 determines time and location information from the user-generated content. In some embodiments, the time and location information includes metadata written into the user-generated content. For example, a user-generated digital photograph may include metadata describing when (e.g., a date and time) and where (e.g., GPS coordinates, a description of a location, etc.) the photo was taken. The content module 202 may then extract and examine the metadata of an item of user-generated content in order to determine the time and location information for that item of the user-generated content.

The cluster module 204, in one embodiment, is configured to identify a cluster of related user-generated content. As used herein, a cluster of related user-generated content includes a set of items of user-generated content relating to a common event and/or activity. In certain embodiments, the cluster module 204 identifies the cluster from the location information of the gathered user-generated content, such that the cluster includes a plurality of items of user-generated content that have geographically similar locations. In certain embodiments, the cluster module 204 identifies the cluster from the time information of the gathered user-generated content, such that the cluster includes a plurality of items of user-generated content which are generated within a similar time period. In further embodiments, the cluster module 204 may form one or more clusters of related user-generated content (e.g., user-generated content relating to a common event and/or activity) based on time and/or location information relating to the user-generated content.

In some embodiments, the cluster module 204 may filter the user-generated content to include only content relating to geographically similar locations. In certain embodiments, the cluster module 204 will only consider user-generated content relating to a certain geographical range, such as a metropolitan area, a city, a postal code, a circle centered on a particular location or coordinate, a neighborhood, a park, a natural preserve, a conservation area, a recreational area, or the like. In some embodiments, the cluster module 204 may further filter the user-generated content based on time requirements, for example that the content was generated during a specific season or time-of-day. In further embodiments, the cluster module 204 may filter the content using a moving window of time so that only content of a certain age is included.

In some embodiments, the cluster module 204 identifies user-generated content as belonging to a cluster based on an identified topic of the content, the topic relating to a common activity (e.g., hiking, fishing, skiing, swimming, surfing, sledding, or the like) and/or a common event (e.g., a farmers' market, a holiday market, a flea market, a festival, a fair, or the like). In one embodiment, an event is something that happens at a particular time or in a particular time period. The event may be a public event, which may be advertised, or may be a private event. An event may happen periodically or may be a single event. In another embodiment, an activity is a sport, a hobby, etc. that a person may engage in at a time chosen by the person. For example, an activity may be skiing at a particular resort or location and may occur during particular hours of operation, for example at a ski resort, or may occur at the person's choosing, such as cross-country skiing on a trail. In one example, an activity or event is something that a person is engaged in where others may have an interest.

The cluster module 204, in one embodiment, identifies one or more topics associated with each item of user-generated content and groups the user-generated content using the identified topics. For example, topics may include fishing, camping, shopping, hiking, and the like. In certain embodiments, the cluster module 204 calculates a probability that the topic of the user-generated content relates to the common event and/or activity and includes content into the cluster based on the calculated probability.

In some embodiments, the cluster module 204 identifies the cluster based on one or more objects identified within each item of user-generated content, the objects relating to one or more of the common event, the common activity, attributes of the common event and/or activity, and the location of the user-generated content. In some embodiments, the cluster module 204 may receive information regarding the objects from the content module 202 or from another module. The identified objects may include stores, shops, stalls, vendors, items for sale, and/or points of interest associated with the event and/or activity.

In some embodiments, the cluster module 204 identifies a cluster based on whether a generation rate at which the related user-generated content is generated exceeds a generation rate threshold. In one embodiment, the cluster module 204 determines whether a cluster exists based on whether the generation rate is at a statistically significant level, wherein the generation rate threshold is selected to delineate the statistically significant level. The generation rate threshold may represent a background activity level, wherein a cluster is formed only where the content relating to the common event and/or activity is generated at a rate above the background activity level. Accordingly, the cluster module 204 may identify that a cluster does not exist (or no longer exists) if the generation rate at which the related user-generated content is generated does not exceed the generation rate threshold.

In some embodiments, the cluster module 204 forms a cluster and/or determines whether a cluster exists based on a weighted assessment of each item of user-generated content relating to a common event and/or activity and having a geographically similar location. In further embodiments, the cluster module 204 may identify the cluster based on the weighted user-generated content. The cluster module 204, in one embodiment, may assign a weight to each content item with a greater weight being assigned to newer user-generated content and a lesser weight being assigned to older user-generated content. Using the weighted assessment, the cluster module 204 may determine that the content related to a past event and/or activity, rather than a current event/activity. Accordingly, the area module 206 may determine that a cluster no longer exists, due to the event or activity not being current, based on the weighted user-generated content.

In some embodiments, the cluster module 204 identifies a cluster of related user-generated content for a plurality of events and/or activities within a geographical region, such as a city, park, or the like. In certain embodiments, the cluster module 204 may generate data identifying a cluster and its related user-generated content for each event and/or activity. In further embodiments, the cluster module 204 may generate a database including the identified clusters, wherein the database may be searchable based on topic and/or location associated with an event and/or activity. In some embodiments, the cluster module 204 may generate a name for the cluster, the name relating to the nature and the location of the event and/or activity.

The area module 206, in one embodiment, is configured to determine an area containing the cluster of related user-generated content. In some embodiments, the area module 206 calculates an area that includes the locations of each item of user-generated content in the cluster. In further embodiments, the area module 206 calculates a perimeter area in excess of the area that includes the location related to each item of user-generated content in the cluster.

Generally, the cluster of related user-generated content relates to an event and/or activity whose boundaries are not permanent and cannot be predefined. Accordingly, the area module 206 identifies a plurality of locations corresponding to the user-generated content of the cluster and determines an area encompassing the plurality of locations. In one embodiment, the area module 206 fits a geometric shape, such as a circle, oval, or polygon, to the outermost locations associated with the cluster. In a further embodiment, the area module 206 may add a perimeter area to the fitted shape, thereby defining an area containing the cluster.

In some embodiments, the area module 206 determines area that includes geographically disjoint regions. For example, a cluster relating to beach locations may include several similarly located beaches that are separate from each other, either due to natural barriers (e.g., rocks or cliffs), artificial barriers (e.g., harbors, ports, or piers), or due to lack of user-generated content relating to certain locations on the shore (e.g., due to prohibited, unpopular, or unsuitable locations).

In some embodiments, the area module 206 identifies a plurality of locations corresponding to the user-generated content of the cluster and centers a circle of a predefined radius on each of the locations. The area module 206 then defines the area containing the cluster as the areas encompassed by the plurality of circles centered on the plurality of locations corresponding to the user-generated content of the cluster. In some embodiments, the defined area will contain detached circles, squares, or other shapes. In some embodiments, the defined area will included regions encompassed by overlapping circles.

The area module 206, in one embodiment, defines a boundary of a cluster of related user-generated content based on the determined area containing the cluster. As used herein, the boundary refers to the perimeter of the determined area containing the cluster of related user-generated content. Where the determined area includes disjoint regions, the boundary includes the plurality of perimeters. In some embodiments, the area module 206 expresses the boundary as a series of coordinates corresponding to the perimeter of the determined area. Accordingly, the boundary may be easily displayed on an electronic map.

In some embodiments, the area module 206 dynamically adjusts the area containing the cluster as the set of user-generated content varies over time. For example, the area module 206 may automatically re-determine the area (and boundary) of the cluster based on the times and locations of newly added user-generated content. As another example, area module 206 may automatically re-determine the area (and boundary) of the cluster in response to user-generated content being removed from the cluster.

The search module 208, in one embodiment, is configured to receive a search query, the search query relating to one or more of the common event and activity of the cluster. In some embodiments, the search query is sent from a user device 114 and received via the network interface 108. In certain embodiments, the search query requests information for attributes and/or objects of the event and/or activity common to the cluster. Responsive to receiving the search query, the search module 208 then retrieves information relating to the common event and/or activity of the cluster and provide a search result.

In one embodiment, the content module 202, cluster module 204, and area module 206 operate independently of the search module 208 to continuously gather user-generated content, identify clusters of related user-generated content, and determine areas containing each cluster of related user-generated content. Thus, when the search module 208 receives the search query, it can retrieve information from pre-existing databases relating to the clusters of user-generated content to provide the search result. For example, the search apparatus 102 may gather the user-generated content, cluster content relating to a geographically similar event and/or activity, and calculate areas and boundaries surrounding the clusters through background processes, while the search module 208 awaits a search query. Responsive to receiving the search query, the search module 208 may derive search results relating to the common event and/or activity of a cluster in a much shorter time frame than if the search apparatus 102 were to initiate the gathering and analysis of the user-generated content in response to receiving the search query.

In some embodiments, the search module 208 identifies a cluster of related user-generated content relating to the search query. For example, one or more of the common event, the common activity, attributes of the common event and attributes of the common activity may be searchable by the search module 208. In further embodiments, the search module 208 may identify an area and/or boundary associated with the identified cluster.

In some embodiments, the search module 208 searches for one or more objects of the event and/or activity common to the cluster based the search query. For example, the search query may inquire as to scented candles at a Christmas market near Dusseldorf, wherein the search module 208 identifies a stall or vendor associated with a Christmas market cluster selling scented candles. In certain embodiments, the search module 208 identifies one or more items of user-generated content of the cluster relating to the search query. For example, responsive to the search query for scented candles at a Christmas market near Dusseldorf, the search module 208 may search within the cluster for user-generated content related to scented candles.

The map display module 210, in one embodiment, is configured to present, on an electronic map, a boundary for the determined area in response to the search module 208 receiving the search query. The boundary corresponds to a cluster of related user-generated content relating to the search query. In some embodiments, the boundary includes a set of coordinates expressible on the electronic map that correspond to the perimeter of the determined area.

In some embodiments, the map display module 210 identifies a cluster of related user-generated content from a plurality of clusters of user-generated content based on the search query. In other embodiments, the map display module 210 receives an indication of the related cluster from the search module 208. In some embodiments, the map display module 210 receives the boundary from the area module 206. In other embodiments, the map display module 210 defines a boundary of a cluster of related user-generated content based on the area containing the cluster determined by the area module 206.

In some embodiments, the map display module 210 indicates, on the electronic map, the relative frequency of content generation within regions of the area containing the cluster. In some embodiments, the map display module 210 indicates, on the electronic map, an age of user-generated content within the area. In certain embodiments, the map display module 210 may indicate the age and/or frequency using different colors, patterns, or the like.

Figure 3:
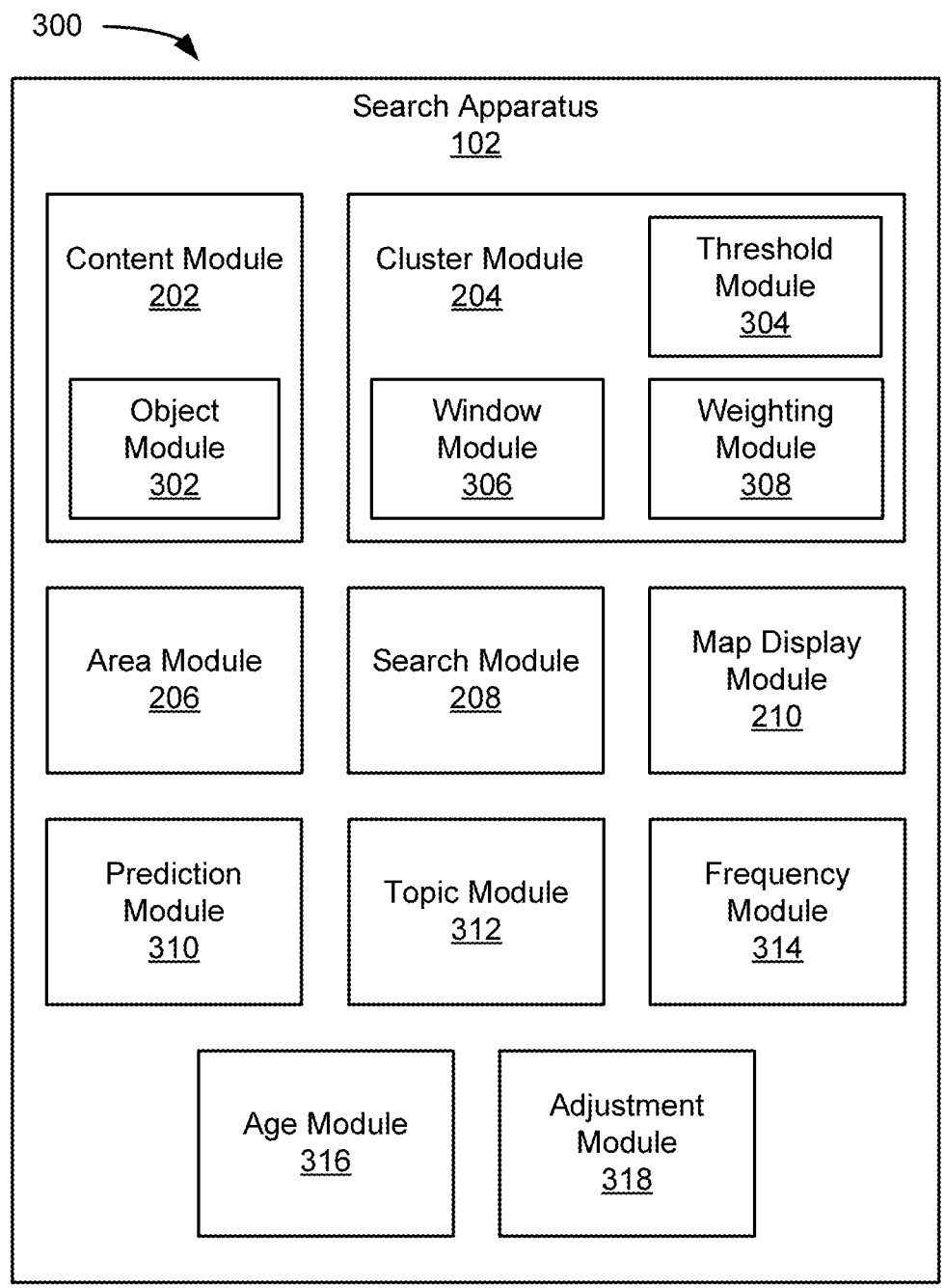
FIG. 3 is a schematic block diagram illustrating another embodiment of another apparatus for presenting search results within a map boundary defined using user-generated content.

FIG. 3 depicts an apparatus 300 for presenting search results within a map boundary defined using user-generated content, according to embodiments of the disclosure. The apparatus 300 includes another embodiment of a search apparatus 102, which includes a content module 202, a cluster module 204, an area module 206, a search module 208, and a map display module 210, which are substantially similar to those described above in relation to the apparatus 200 of FIG. 2. In some embodiments, the search apparatus 102 may also include one or more of an object module 302, a threshold module 304, a window module 306, a weighting module 308, a prediction module 310, a topic module 312, a frequency module 314, an age module 316, and an adjustment module 318, which are described below. The modules of the search apparatus 102 may be communicatively coupled to one another.

The content module 202 may be substantially similar to the content module 202 described above with reference to FIG. 2. In some embodiments, the content module 202 further includes an object module 302 that identifies one or more objects within each item of user-generated content. The objects may relate to one or more of the common event, the common activity, attributes of the common event and/or activity, and the location of the user-generated content.

In some embodiments, the object module 302 performs a contextual analysis on the user-generated content to identify the one or more objects. For example, the object module 302 may analyze user-generated image content using an object recognition algorithm to identify the one or more objects. For example, the object module 302 may analyze a photograph on a social media website and determine that a person is holding a fish so that the photograph relates to catching fish. The content module 202 may identify where the photograph was taken from metadata of the photograph to determine a potential location of good fishing. In another embodiment, the object module 302 may identify a landmark within the photograph to identify a location. As another example, the object module 302 may search for keywords within user-generated text content to identify the one or more objects. In certain embodiments, the identified objects are searchable and may be included with search results relating to the event and/or activity. The content module 202 may use a combination of keywords, metadata, objects identified through object recognition software, etc. to determine an activity or event, a location, etc.

In one embodiment, the objects identified by the object module 302 include stores, shops, stalls, vendors associated with the event and/or activity. For example, the object module 302 may recognize names of shops or vendors in user-generated images. In another embodiment, the objects identified by the object module 302 include items for sale at the event and/or activity. For example, the object module 302 may use an object recognition algorithm of user-generated images to determine that a particular booth sells toys. In yet another embodiment, the objects identified by the object module 302 include points of interest associated with the event and/or activity.

The cluster module 204 may be substantially similar to the content module 202 described above with reference to FIG. 2. In general, the cluster module 204 identifies patterns (e.g., trends) of user-generated, social networking content associated with an event and/or activity, groups the user-generated content based on the identified pattern, and filters the group of content based on times, locations, and generation rates of the user-generated content to generate a cluster of related user-generated content. In some embodiments, the cluster module 204 includes a threshold module 304 that compares a generation rate at which the related user-generated content is generated to a generation rate threshold, a window module 306 that determines if an item of user-generated content is generated within a moving window of time, and/or a weighting module 308 that assign greater weight to newer user-generated content and lesser weight to older user-generated content. The cluster module 204 may then identify a cluster of related user-generated content based, in part, on the output of the modules 304-308.

The threshold module 304, in one embodiment, is a sub-module of the cluster module 204 that is configured to compare a generation rate at which the related user-generated content is generated to a generation rate threshold. The generation rate threshold may represent a minimum activity level for inclusion into the cluster. Responsive to comparing the generation rate to the generation threshold, the threshold module 304 may then communicate the result to the cluster module 204, wherein the cluster module 204 identifies user-generated content as belonging to the cluster based on whether the generation rate exceeds the generation rate threshold.

In some embodiments, the threshold module 304 determines the generation rate at which the related user-generated content is generated. In some embodiments, the generation rate measures content generation by a particular user or group of users. In other embodiments, the generation rate measures content generation for a particular location or region. In further embodiments, the generation rate measures content generation within a region for a particular topic. In some embodiments, the generation rate threshold is based on the type of activity measured by the generation rate.

The window module 306, in one embodiment, is a sub-module of the cluster module 204 that is configured to determine if an item of user-generated content is generated within a moving window of time. The moving window of time may include a continually updated, predetermined amount of time from the present. Thus, as time passes, certain items of user-generated content will no longer be within the moving window of time due to the content being older than the predetermined amount of time. The window module 306 may then indicate to the cluster module 204 which items of user-generate content were generated within the moving window of time, wherein the cluster module 204 identifies user-generated content as belonging to the cluster based on whether the user-generated content is within the moving window of time.

The weighting module 308, in one embodiment, is a sub-module of the cluster module 204 that is configured to assign greater weight to newer user-generated content and lesser weight to older user-generated content. In some embodiments, the weighting module 308 receives user-generated content having similar locations and topics from the cluster module 204 and assigns weights to the received user-generated content. In certain embodiments, the weighting module 308 receives a set of user-generated content generated within a particular time period from the window module 306 and orders the set based on age (e.g., on data of creation). The weighting module 308 may then assign weights to content items in the set based on the order.

In some embodiments, the weighting module 308 examines age and/or time information associated with each gathered item of user-generated content to determine a weight for the item. In certain embodiments, the weighting module 308 examines metadata of an item user-generated content to identify an age associated with the content item. In other embodiments, the weighting module 308 may receive age information from the age module 316, wherein the weighting module 308 assigns a weight based on the received age information.

The weighting module 308 may then communicate the assigned weights to the cluster module 204, wherein the cluster module 204 identifies the cluster based on the weighted user-generated content. In one embodiment, each item of user-generated content is given a different weight. In another embodiment, items of user-generated content are grouped according to age, wherein each item with a group is assigned the same weight.

The prediction module 310, in one embodiment, is configured to identify one or more of an event, an activity, attributes of an event, and attributes of an activity based on objects identified by the content module 202 and/or the object module 302. In certain embodiments, the attributes of the event or activity include times and locations for the event or activity. In some embodiments, the prediction module 310 receives an indication of objects recognized within the user-generated content from the content module 202 and/or the object module 302. The prediction module 310 may further provide the identified event, activity, and/or attributes of the event/activity of each item of user-generated content to the cluster module 204 for use in identifying the cluster.

In some embodiments, the prediction module 310 selects a name for the event and/or activity. In some embodiments, the prediction module 310 may select the name based on a topic or theme of the event or activity. In some embodiments, the prediction module 310 may select the name based on the location or other attributes of the event and/or activity. In further embodiments, the prediction module 310 may associate search terms with the cluster based on the identity and/or attributes of the event or activity.

The topic module 312, in one embodiment, is configured to identify a topic of each item of user-generated content. The topic module 312 may identify the topic using any number of context analysis techniques. In certain embodiments, the topic module 312 analyzes metadata of the user-generated content to identify the topic. In some embodiments, the topic module 312 selects a topic for the user-generated content from a predefined list of possible topics. In one embodiment, the topic module 312 indicates the identified topic to the cluster module 204, wherein the cluster module 204 identifies user-generated content as belonging to the cluster based, in part, on the identified topic.

In some embodiments, the topic module 312 analyzes images and/or text within each item of user-generated content to identify the topic. For example, the topic module 312 may use an image recognition algorithm and/or an object recognition algorithm to determine that a user-generated photograph includes a caught fish, wherein the topic module 312 then identifies "fishing" as a topic of the photograph. As another example, the topic module 312 may use a text recognition algorithm to determine that text included in a user-generated status update names a retail location, wherein the topic module 312 then identifies "shopping" as a topic of the status update. In one embodiment, the topic module 312 includes topics and one or more sub-topics. For example, the topic module 312 may identify a topic of "fishing" with a sub-topic of "fly fishing." Sub-topics may allow the search module 208 and map display module 210 to more efficiently identify a boundary on an electronic map more closely aligned to the search query. The sub-topics may have a hierarchical structure.

In certain embodiments, the topic module 312 evaluates a plurality of factors when identifying the topic. The plurality of factors may include one or more of image subject matter, text, comments, captions, and the like. For example, if the item of user-generated content is a digital photograph, the topic module 312 may evaluate subject matter of the photograph, text within the photograph, a caption associated with the photograph, and any user-generated comments associated with the photograph. In certain embodiments, different factors are given different weight when identifying the topic of the user-generated content. For example, captions and subject matter of the digital photograph may be given greater weight than comments and text within the photograph.

The frequency module 314, in one embodiment, is configured to identify a relative frequency at which user-generated content is generated within the area containing the cluster of related user-generated content. In one embodiment, the frequency module 314 communicates the relative frequency to the map display module 210, wherein the map display module 210 presents the relative frequency on the electronic map. In certain embodiments, the frequency module 314 may also communicate relative frequency information as a real-time heat-map indicating the frequency at which content is generated within the area defining the cluster. The heat-map may indicate the frequency in a variety of ways, for example, by using different colors, patterns, grayscale, letters, numbers, etc. to represent a higher (or lower) frequency.

The frequency module 314 may identify the relative frequency using any number of statistical analysis tools. In certain embodiments, the frequency module 314 counts the content items generated within a particular region of the area defining the cluster. In further embodiments, the frequency module 314 may only count those content items generated within a predetermined time frame. The frequency module 314 may then identify those regions of the area associated with higher levels (e.g., higher relative frequencies) of content generation. In certain embodiments, the frequency module 314 may rank each region according to its level of content generation.

In some embodiments, the frequency module 314 may identify a rate of content generation, such as an average number of content items generated per time period (e.g., per hour, per day, per week). The frequency module 314 may then identify regions of the area having the highest rates of generation. In certain embodiments, the frequency module 314 may rank each region according to its rate of content generation.

In certain embodiments, the frequency module 314 may categorize regions within the area defining the cluster as having a relative frequency of content generation within a particular frequency range. For example, the frequency module 314 may categorize each region into one of three or more ranges associated with high, moderate, or low frequencies of content generation. In another embodiment, the frequency module 314 may group regions according to rank, such as the top (or bottom) five regions for content generation within the area.

The age module 316, in one embodiment, is configured to identify an age of user-generated content within the area. In some embodiments, the age module 316 may identify the age of the newest content item generated within each region of the area defining the cluster, the area including a plurality of regions. The age module 316 may then identify those regions of the area associated with the newest content items. In certain embodiments, the age module 316 may rank each region according to the age of its latest content item.

In one embodiment, the age module 316 communicates the age to the map display module 210, wherein the map display module 210 presents the age of one or more content items on the electronic map. The map display module 210 may indicate the age in a variety of ways, for example, by using different colors, patterns, grayscale, letters, numbers, etc. to represent regions with newer (or older) content. The age module 316 may identify the age by examining time information associated with the user-generated content. In certain embodiments, the age module 316 examines metadata associated with the user-generated content to identify the age.

The adjustment module 318, in one embodiment, is configured to dynamically adjust the area and boundary of the cluster based on the times and locations of the user-generated content. In some embodiments, the adjustment module 318 continually receives information from one or more of the cluster module 204, threshold module 304, the window module 306, the frequency module 314, and the age module 316 defining which user-generated content is currently included in the cluster. As the content items associated with the cluster change, the adjustment module 318 may then re-determine the area and boundary associated with the cluster based on the locations of those content items included in the cluster, wherein the determined area circumscribes the locations related to each item of user-generated content in the cluster.

In certain embodiments, the adjustment module 318 may redefine the cluster to exclude certain items of user-generated content. For example, the adjustment module 318 may continually filter the cluster to only include content items generated within a certain time window (e.g., within the last month). As another example, the adjustment module 318 may continually refine the cluster to include only a predefined amount of latest content items. In yet another example, the adjustment module 318 may continually update the cluster to include only content from locations where content is generated above a generation threshold.

Figure 4:
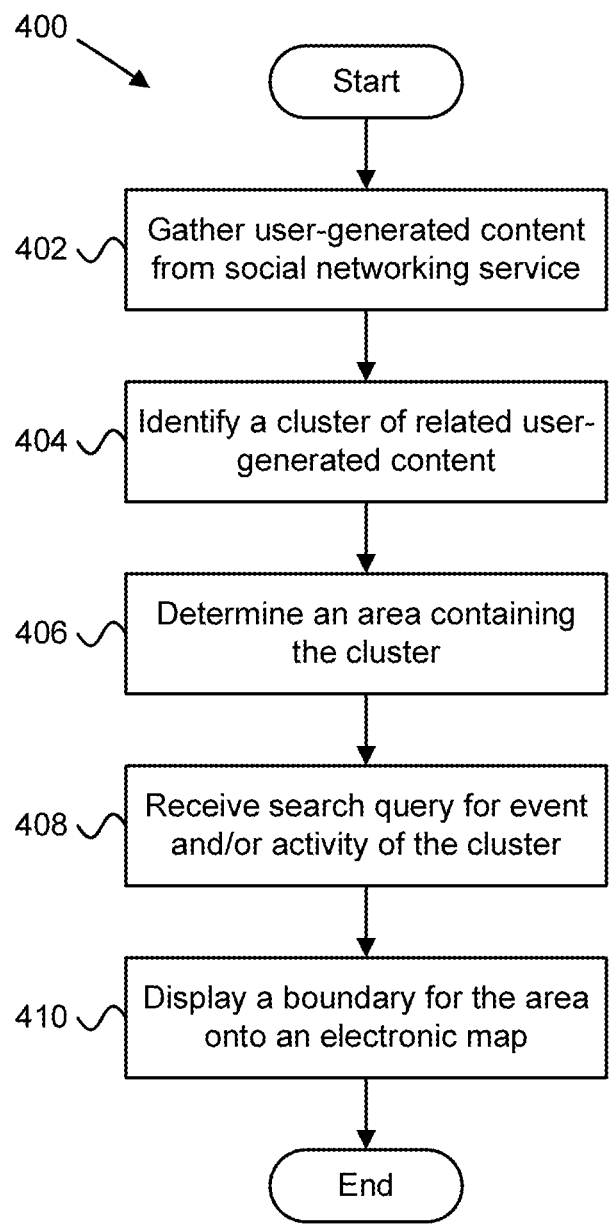
FIG. 4 is a schematic flow chart diagram illustrating one embodiment of a method for presenting search results within a map boundary defined using user-generated content.

FIG. 4 depicts a method 400 for presenting search results within a map boundary defined using user-generated content, according to embodiments of the disclosure. In some embodiments, the method 400 is performed by a server, such as the server 101 described above with reference to FIG. 1. In other embodiments, the method 400 may be performed by a search apparatus, such as the search apparatus 102, the apparatus 200, or the apparatus 300 described above with reference to FIGS. 1-3. In certain embodiments, the method 400 may be performed by a processor executing program code, for example, a microcontroller, a microprocessor, a central processing unit (CPU), a graphics processing unit (GPU), an auxiliary processing unit, a FPGA, or the like.

The method 400 begins with gathering 402 user-generated content from a plurality of users of a social networking service. The user-generated content relates to an event and/or an activity and each item includes time and location information. In some embodiments, gathering 402 the user-generated content includes polling a social networking server, such as the social networking server 112, for newly generated content from the plurality of users. The method 400 identifies 404 a cluster of related user-generated content. In some embodiments, identifying 404 the cluster of related user-generated content includes identifying the cluster based on one or more of object within the content, topics of the content, locations of the content, and times the content was generated.

The method 400 determines 406 an area containing the identified cluster. In some embodiments, determining 406 the area may include calculating an area that includes the locations of each item of user-generated content in the cluster. In further embodiments, determining 406 the area may include calculating a perimeter area in excess of the area that includes the location related to each item of user-generated content in the cluster. Alternatively, in certain embodiments, determining 406 the area may include circumscribing the locations of each item of user-generated content with a circle of a predetermined radius.

The method 400 receives 408 a search query for an event and/or an activity relating to the cluster. In certain embodiments, receiving 408 the search query includes identifying a cluster relating to the search query. Responsive to receiving 408 the search query, the method 400 displays 410 a boundary for the determined area onto an electronic map, and the method 400 ends. In certain embodiments, displaying 410 the boundary includes providing the electronic map along with map coordinates describing a perimeter of the area containing the cluster of related user-generated content.

Figure 5:
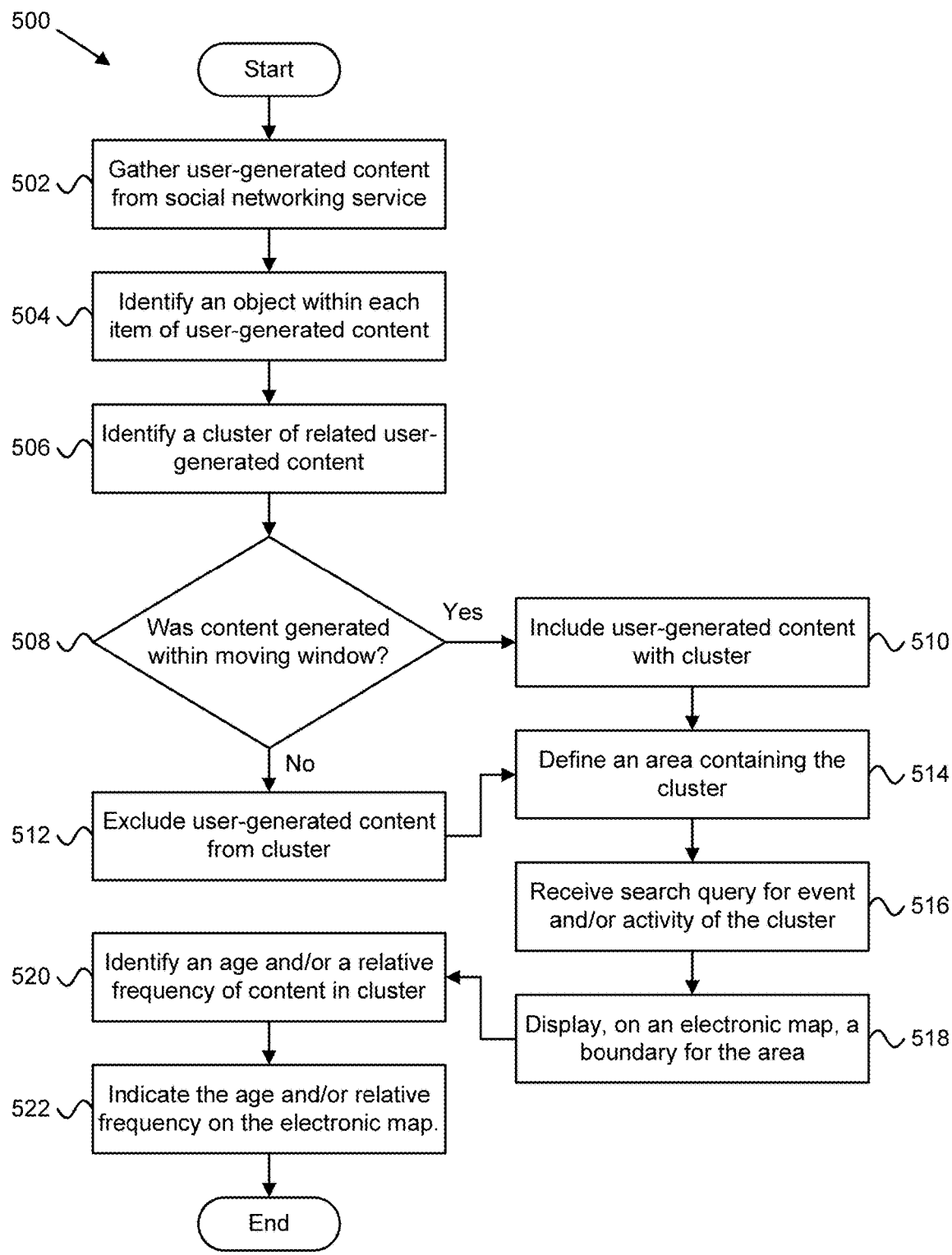
FIG. 5 is a schematic flow chart diagram illustrating another embodiment of a method for presenting search results within a map boundary defined using user-generated content.

FIG. 5 depicts a method 500 for presenting search results within a map boundary defined using user-generated content, according to embodiments of the disclosure. In some embodiments, the method 500 is performed by a server, such as the server 101 described above with reference to FIG. 1. In other embodiments, the method 500 may be performed by a search apparatus, such as the search apparatus 102, the apparatus 200, or the apparatus 300 described above with reference to FIGS. 1-3. In certain embodiments, the method 500 may be performed by a processor executing program code, for example, a microcontroller, a microprocessor, a central processing unit (CPU), a graphics processing unit (GPU), an auxiliary processing unit, a FPGA, or the like.

The method 500 begins with gathering 502 user-generated content from a plurality of users of a social networking service. The user-generated content relates to one or more of an event and an activity and each item includes time and location information. In some embodiments, gathering 502 the user-generated content includes polling a social networking server, such as the social networking server 112, for newly generated content from the plurality of users.

The method 500 identifies 504 an object within each item of user-generated content. In some embodiments, identifying 504 the object includes performing a contextual analysis on the user-generated content to identify the one or more objects. The method 500 identifies 506 a cluster of related user-generated content. In some embodiments, identifying 506 the cluster of related user-generated content includes identifying the cluster based on one or more of object within the content, topics of the content, locations of the content, and times the content was generated.

The method 500 determines 508 whether an item of related content of the cluster was generated within a predefined moving window of time. Determining 508 whether the related content was generated within the moving window of time may include comparing an age or a date of creation for the item of related content to a threshold defining the moving window of time, thereby determining whether the item of related content is older than a threshold age.

If the related content was generated within the time window, the method 500 proceeds to include 510 the related content with the cluster. Otherwise, if the related content was not generated within the time window, the method 500 proceeds to exclude 512 the related content from the cluster.

The method 500 determines 514 an area containing the cluster of related user-generated content. In some embodiments, determining 514 the area may include calculating an area that includes the locations of each item of user-generated content in the cluster. In further embodiments, determining 514 the area may include calculating a perimeter area in excess of the area that includes the location related to each item of user-generated content in the cluster. Alternatively, in certain embodiments, determining 514 the area may include circumscribing the locations of each item of user-generated content with a circle of a predetermined radius.

The method 500 receives 516 a search query for an event and/or an activity relating to the cluster. In certain embodiments, receiving 516 the search query includes identifying a cluster relating to the search query. Responsive to receiving 516 the search query, the method 500 displays 518 a boundary for the determined area onto an electronic map. In certain embodiments, displaying 518 the boundary includes providing the electronic map along with map coordinates describing a perimeter of the area containing the cluster of related user-generated content.

The method 500 identifies 520 one or more of an age of content in the cluster and a relative frequency of content generation in the cluster, and the method 500 ends. In some embodiments, identifying 520 an age and/or a relative frequency includes categorizing a region within the area based on the age of its newest user-generated content and/or based on its relative frequency of content generation. Responsive to identifying 520 the age and/or relative frequency of content in the cluster, the method 500 proceeds to indicate 522 the age and/or the relative frequency on the electronic map.

FIGS. 6A-6D depict an electronic map 600 presenting search results within a map boundary defined using user-generated content, according to embodiments of the disclosure. In the depicted embodiment, the electronic map 600 is of an urban area and shows streets within a city neighborhood.

Figure 6A:
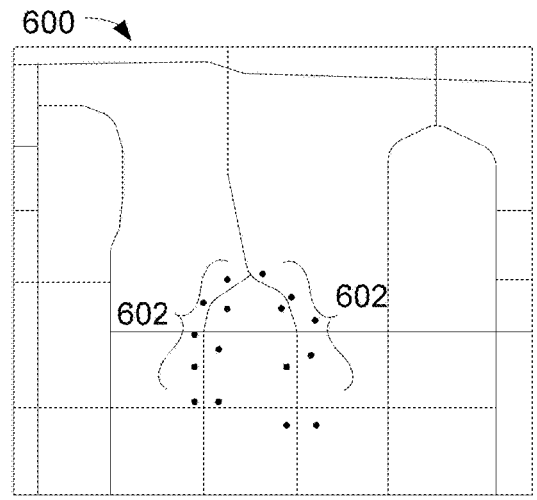
FIG. 6A is a diagram illustrating one embodiment of an electronic map presenting search results within a map boundary defined using user-generated content where locations of events and/or activities are shown.

FIG. 6A depicts the electronic map 600 plotting a plurality of locations 602 associated with a cluster of related user-generated content. As discussed above with reference to FIGS. 2 and 3, the cluster contains a plurality of items of user-generated content relating to a common event or activity having a geographically similar location. Each item of user-generated is associated with one of the locations 602, and the plurality of locations 602 are shown on the electronic map 600.

Figure 6B:
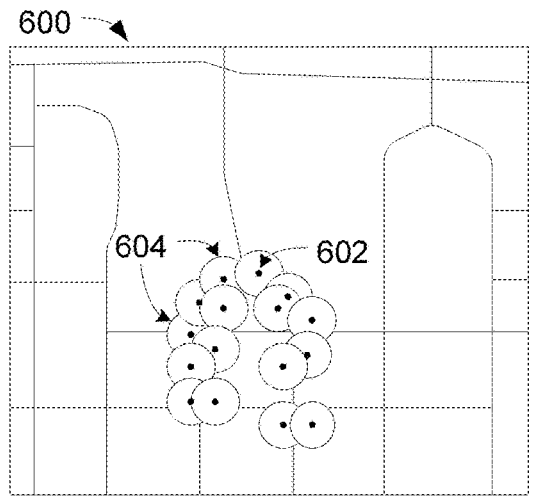
FIG. 6B is a diagram illustrating another embodiment of an electronic map presenting search results within a map boundary defined using user-generated content where locations of events and/or activities are shown with an area around each event or activity.

FIG. 6B depicts the electronic map 600 as an area containing the cluster is determined, for example using a search apparatus such as the search apparatus 102 described above with reference to FIGS. 1-3. A circle 604 of a predetermined radius is centered on each location 602 of related user-generated content. As depicted, in some instances the circles overlap, while in other instances the circles are detached from one another.

In some embodiments, the circles 604 are drawn in an order based on the age of the user-generated content associated with one of the locations 602 such that circles 604 associated with newer content are displayed on top of circles 604 associated with older content. In further embodiments, the relative age of each item of user-generated content may be displayed using different colors, patterns, or the like.

In some embodiments, the circles 604 are drawn in an order based on the content generation frequency associated with one of the locations 602 such that circles 604 associated with higher generation rates are displayed on top of circles 604 associated with lower generation rates. In further embodiments, the relative content generation frequency of each location of user-generated content may be displayed using different colors, patterns, or the like.

Figure 6C:
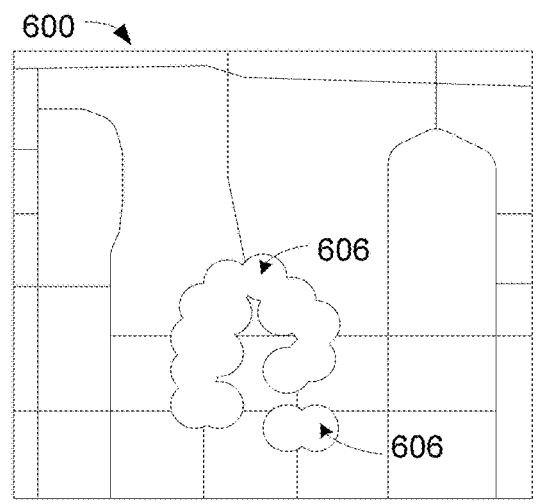
FIG. 6C is a diagram illustrating another embodiment of an electronic map presenting search results within a map boundary defined using user-generated content where boundaries of events and/or activities are shown.

FIG. 6C depicts the electronic map 600 after an area 606 containing the cluster of related user-generated content is identified based on the plurality of circles 604. In some embodiments, the area 606 includes all areas encompassed by the plurality of circles 604. In further embodiments, the area 606 may include an additional perimeter area in excess of the areas encompassed by the plurality of circles 604. As shown, in certain embodiments the area 606 includes geographically disjoint regions of the electronic map 600. The disjoint regions may be due to due to natural barriers, artificial barriers, or due to lack of user-generated content relating to certain locations on the electronic map 600.

Figure 6D:
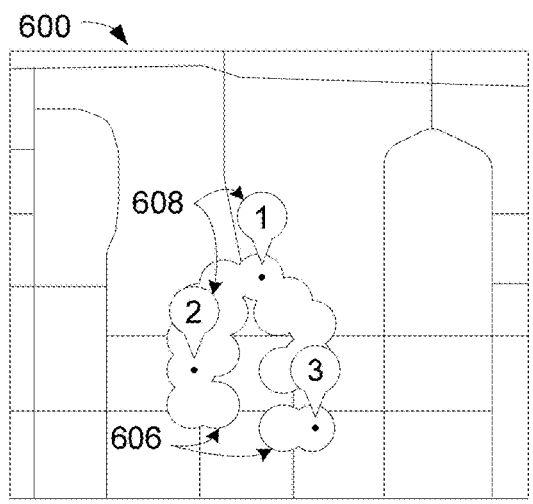
FIG. 6D is a diagram illustrating another embodiment of an electronic map presenting search results within a map boundary defined using user-generated content where boundaries of events and/or activities are shown with specific events and/or activities.

FIG. 6D depicts the electronic map 600 presented as a search result to a user search query relating to the common event and/or activity of the cluster of related user-generated content. The search result includes the area 606 containing the cluster as well as specific locations 608 (e.g., locations "1," "2," and "3") associated with the results of the search query. The displayed specific locations 608, in one embodiment, include links to additional information. In various examples, the specific locations 608 may be include a link to a website, an address, information about the event or activity, etc. For example, the user may be searching for novelty items in a seasonal market in the urban area depicted in the electronic map 600.

A search apparatus, such as the search apparatus 102 described above with reference to FIGS. 1-3, may identify a cluster of related user-generated content relating to the seasonal market (e.g., a common event of the related user-generated content) and may display the area 606 containing the cluster on the electronic map 600. Additionally, the search apparatus may search for identified objects within the user-generated content that match the novelty items included in the search query and may display the specific locations 608 associated with matching objects. For example, the search apparatus may identify user-generated content including seasonal candles within the cluster and display the specific locations 608 corresponding to the identified items of user-generated content.

The FIGS. 6A-6D of the electronic map 600 are intended to be explanatory and include information that may or may not be included on an electronic map 600 displayed to a user. For example, the information displayed in FIGS. 6A and 6B may demonstrate identifying a cluster and area around events or activities, but the information displayed in FIGS. 6A and 6B may not be displayed to a user. One of skill in the art will recognize information that may be useful to a user to be displayed and information that may not be displayed.

Figure 7A:
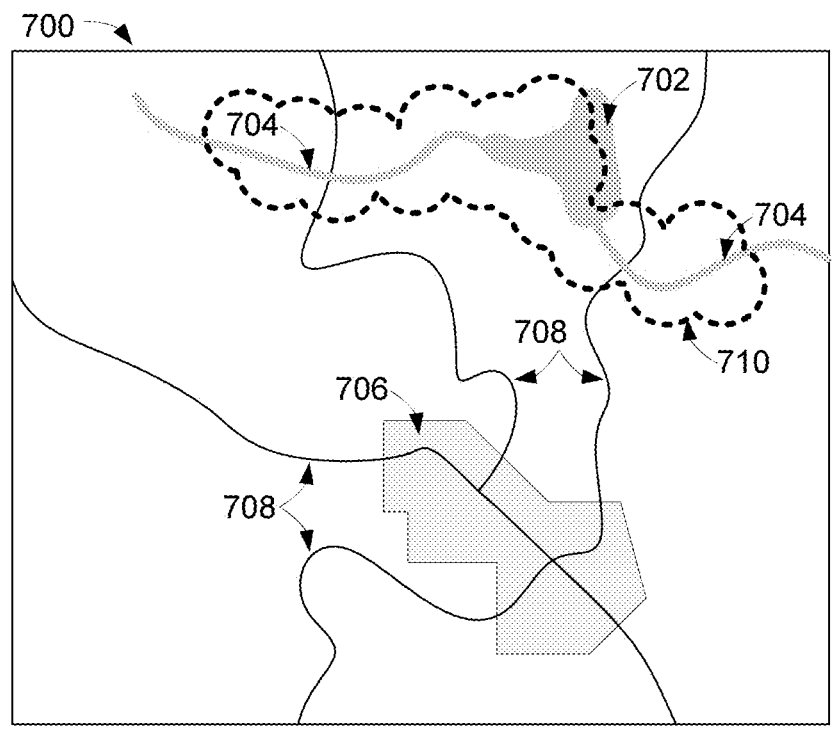
FIG. 7A is a diagram illustrating one embodiment of an electronic map presenting search results within a map boundary defined using user-generated content where an area of events and/or activities is shown.
Figure 7B:
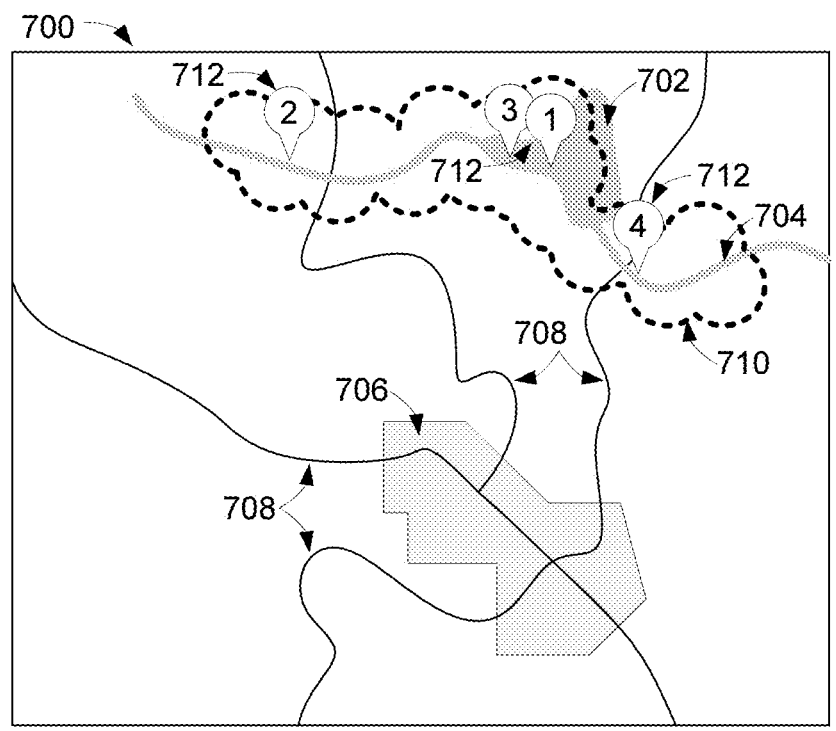
FIG. 7B is a diagram illustrating another embodiment of an electronic map presenting search results within a map boundary defined using user-generated content where an area of events and/or activities is shown along with specific events and/or activities.

FIGS. 7A-7B depicts an electronic map 700 presenting search results within a map boundary defined using user-generated content, according to embodiments of the disclosure. In the depicted embodiment, the electronic map 700 is of a rural recreational area and shows a lake 702 and river 704 near a city 706. The electronic map 700 may further show a plurality of highways 708 leading from the city 706 to the lake 702 and/or river 704.

FIG. 7A depicts the electronic map 700 displaying an area 710 containing a cluster of related user-generated content. As discussed above with reference to FIGS. 2 and 3, the cluster contains a plurality of items of user-generated content relating to a common event or activity having a geographically similar location. Each item of user-generated is associated with a particular location, and the area 710 containing the cluster is based on these locations. In some embodiments, the area 710 includes the locations related to each item of user-generated content in the cluster. In further embodiments, the area 710 may include an additional perimeter area in excess of the areas including the locations related to each item of user-generated content in the cluster.

FIG. 7B depicts the electronic map 700 presented as a search result to a user search query relating to the common event and/or activity of the cluster of related user-generated content. The search result includes the area 710 containing the cluster as well as specific locations 712 (e.g., locations "1," "2," "3," and "4") associated with the results of the search query. For example, the user may be searching for novelty items in a seasonal market in the urban area depicted in the electronic map 700. A search apparatus, such as the search apparatus 102 described above with reference to FIG. 13, may identify a cluster of related user-generated content relating to fishing spots near the lake 702 and river 704 (e.g., a common activity of the related user-generated content) and may display the area 710 containing the cluster on the electronic map 700. Additionally, the search apparatus may search for identified objects within the user-generated content that match points of interest included in the search query and may display the specific locations 712 associated with matching objects. For example, the search apparatus may identify user-generated content including specific types of fish (e.g., trout or bass) within the cluster and display the specific locations 712 corresponding to the identified items of user-generated content.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a content module that gathers user-generated content posted by a plurality of users to a social networking service and relating to one or more of an event and an activity, each item of user-generated content comprising a time when the user generated the user-generated content and a location where the user generated the user-generated content;
a cluster module that identifies a cluster of related user-generated content based on the time and location information of the gathered user-generated content, the cluster comprising a physical area on a map with a plurality of items of user-generated content relating to one or more of a common event and an activity that have a plurality of locations with a geographically similar location;
an area module that determines a physical area on a map containing the cluster of related user-generated content, the area comprising a boundary around the perimeter of the area and around the cluster;
a search module that receives a search query, the search query related to one or more of the common event and activity of the cluster; and
a map display module that, in response to receiving the search query, presents, on an electronic map, the boundary for the determined area,
wherein said modules comprise one or more of hardware circuits, a programmable hardware device, and a processor executing code stored in memory.

2. The apparatus of claim 1, wherein the content module further comprises an object module that identifies one or more objects within each item of user-generated content, the objects relating to one or more of the common event, the common activity, and the location of the user-generated content.

3. The apparatus of claim 2, wherein the object module performs a contextual analysis on the user-generated content to identify the one or more objects.

4. The apparatus of claim 2, further comprising a prediction module that uses the identification of the one or more objects within the user-generated content to identify one or more of an event, an activity, attributes of an event, and attributes of an activity, wherein the cluster module uses the event, the activity, attributes of the event, and attributes of the activity of each item of user-generated content to identify the cluster and wherein one or more of the common event, the common activity, attributes of the common event and attributes of the common activity are searchable by the search module.

5. The apparatus of claim 1, further comprising a topic module that identifies a topic of each item of user-generated content, wherein the cluster module identifies user-generated content as belonging to the cluster based on the identified topic.

6. The apparatus of claim 1, wherein the map display module identifies, based on the search query, the cluster of related user-generated content from a plurality of clusters of user-generated content, wherein map display module presents the boundary for the determined area of the identified cluster.

7. The apparatus of claim 1, wherein the cluster module further comprises a threshold module that compares a generation rate at which the related user-generated content is generated to a generation rate threshold, wherein the cluster module identifies the cluster based on whether the generation rate exceeds the generation rate threshold.

8. The apparatus of claim 1, wherein the cluster module further comprises a window module that determines if an item of user-generated content is generated within a moving window of time, wherein the cluster module identifies user-generated content as belonging to the cluster based on whether the user-generated content is within the moving window of time.

9. The apparatus of claim 1, wherein the cluster module further comprises a weighting module that assigns greater weight to newer user-generated content and lesser weight to older user-generated content, wherein the cluster module identifies the cluster based on the weights assigned to the user-generated content.

10. The apparatus of claim 1, further comprising a frequency module that identifies a relative frequency of user-generated content within the area, wherein the map display module indicates the relative frequency on the electronic map.

11. The apparatus of claim 1, further comprising an age module that identifies an age of user-generated content within the area, wherein the map display module indicates the age on the electronic map.

12. The apparatus of claim 1, further comprising an adjustment module that dynamically adjust the area and boundary of the cluster based on the times and locations of the user-generated content.

13. The apparatus of claim 1, wherein the determined area includes the locations related to each item of user-generated content in the cluster.

14. The apparatus of claim 13, wherein the determined area includes a perimeter area in excess of an area that includes the locations related to each item of user-generated content in the cluster.

15. A method comprising:
  gathering, by use of a processor, user-generated content posted by a plurality of users to a social networking service and relating to one or more of an event and an activity, each item of user-generated content comprising a time when the user-generated content was generated and a location where the user-generated content was generated;
  identifying a cluster of related user-generated content based on the time and location information of the gathered user-generated content, the cluster comprising a physical area on a map with a plurality of items of user-generated content relating to one or more of a common event and an activity that have a plurality of locations with a geographically similar location;
  determining a physical area on a map containing the cluster of related user-generated content, the area comprising a boundary around the perimeter of the area and around the cluster;
  receiving a search query, the search query related to one or more of the common event and activity of the cluster; and
  displaying, on an electronic map, the boundary for the determined area in response to receiving the search query.

16. The method of claim 15, further comprising identifying one or more objects within each item of user-generated content, the objects relating to one or more of the common event, the common activity, and the location of the user-generated content.

17. The method of claim 15, wherein identifying a cluster of related user-generated content comprises determining if an item of user-generated content is generated within a moving window of time and identifying user-generated content as belonging to the cluster based on whether the user-generated content is within the moving window of time.

18. The method of claim 15, further comprising:
  identifying one or more of an age and a relative frequency of user-generated content within the area; and
  indicating the one or more of age and relative frequency on the electronic map.

19. The method of claim 15, further comprising dynamically adjusting the area and boundary of the cluster based on the times and locations of the user-generated content.

20. A program product comprising a non-transitory, computer readable storage medium that stores code executable by a processor, the executable code comprising code to perform:
  gathering, by use of a processor, user-generated content posted by a plurality of users to a social networking service and relating to one or more of an event and an activity, each item of user-generated content comprising a time when the user-generated content was generated and a location where the user-generated content was generated;
  identifying a cluster of related user-generated content based on the time and location information of the gathered user-generated content, the cluster comprising a plurality of items of user-generated content relating to one or more of a common event and an activity that have a plurality of locations with a geographically similar location;
  determining a physical area on a map containing the cluster of related user-generated content, the area comprising a boundary around the perimeter of the area and around the cluster;
  receiving a search query, the search query related to one or more of the common event and activity of the cluster; and
  displaying, on an electronic map, the map boundary for the determined area in response to receiving the search query.

* * * * *